United States Patent [19]

LaBaw et al.

[11] Patent Number: 4,904,487

[45] Date of Patent: Feb. 27, 1990

[54] UNIFORMLY-COLORED, CHEESE FLAVORED, MICROWAVEABLE POPCORN

[75] Inventors: Glenn D. LaBaw, Greenwich, Conn.; Gerald D. Hebert, Hopatcong; Hanan Reich, Fair Lawn, both of N.J.

[73] Assignee: Nabisco Brands, Inc., East Hanover, N.J.

[21] Appl. No.: 174,761

[22] Filed: Mar. 29, 1988

[51] Int. Cl.⁴ .................. B65D 81/34; A23L 1/18; A23L 1/275

[52] U.S. Cl. .................... 426/107; 426/111; 426/115; 426/120; 426/126; 426/250; 426/234; 426/93

[58] Field of Search ............... 426/93, 107, 113, 234, 426/243, 241, 242, 250, 251, 120, 111, 115

[56] References Cited

U.S. PATENT DOCUMENTS

| | | | |
|---|---|---|---|
| 2,663,645 | 12/1953 | Park | 426/250 |
| 3,038,807 | 6/1962 | Cathcart et al. | 426/250 |
| 3,039,877 | 6/1962 | Borenstein | 426/250 |
| 3,425,845 | 2/1969 | Dunn | 426/111 |
| 3,477,858 | 11/1969 | Wells et al. | 426/293 |
| 3,519,439 | 7/1970 | Dunn | 426/111 |
| 3,556,815 | 1/1971 | Fujiwara | 426/250 |
| 3,617,309 | 11/1971 | Rebane | 426/93 |
| 3,704,133 | 11/1972 | Kracauer | 426/93 |
| 3,843,814 | 10/1974 | Kirstein | 426/93 |
| 3,851,574 | 12/1974 | Katz et al. | |
| 3,853,996 | 12/1974 | Begemann et al. | 426/582 |
| 3,882,255 | 5/1975 | Gorham, Jr. et al. | |
| 3,908,024 | 9/1975 | Wankler | 426/293 |
| 3,922,365 | 11/1975 | Ney et al. | 426/582 |
| 3,961,091 | 6/1976 | Caccavale et al. | 426/93 |
| 3,969,535 | 7/1976 | Bourns | 426/111 |
| 3,973,045 | 8/1976 | Brandberg et al. | 426/293 |
| 4,076,847 | 2/1978 | Johnson et al. | 426/293 |
| 4,096,281 | 6/1978 | Young et al. | 426/93 |
| 4,166,208 | 8/1979 | Martel et al. | |
| 4,172,900 | 10/1979 | Dooler | 426/582 |
| 4,219,573 | 8/1980 | Borek | 426/111 |
| 4,251,551 | 2/1981 | Van Hulle et al. | 426/293 |
| 4,292,332 | 9/1981 | McHam | 426/111 |
| 4,450,180 | 5/1984 | Watkins | 426/111 |
| 4,496,816 | 1/1985 | McNamara | |
| 4,525,367 | 6/1985 | Allison | 426/118 |
| 4,563,561 | 1/1986 | Vaeth et al. | |
| 4,569,847 | 2/1986 | Andrews | 426/582 |
| 4,571,337 | 2/1986 | Cage et al. | 426/107 |
| 4,596,713 | 6/1986 | Burdette | |
| 4,640,842 | 2/1987 | May | |
| 4,643,907 | 2/1987 | Player et al. | 426/582 |
| 4,678,882 | 7/1987 | Bohrer et al. | 426/107 |
| 4,691,374 | 9/1987 | Watkins et al. | 426/111 |
| 4,716,061 | 12/1987 | Winter | 426/107 |
| 4,735,513 | 4/1988 | Watkins | 426/107 |
| 4,751,090 | 6/1988 | Belleson et al. | 426/93 |
| 4,753,815 | 6/1988 | Kielsmeier et al. | 426/296 |
| 4,767,636 | 8/1988 | Ramos | 426/293 |

FOREIGN PATENT DOCUMENTS

WO8702334  4/1987  PCT Int'l Appl. ............. 426/111

OTHER PUBLICATIONS

Food Englyeering 1/65 Food Colors (Reprint).
Packer/Processor 6/68 Color Additives (Reprint).
Perfume & Flavor Chemicals 1969 Arctander #549,3056,3057.
Packaging Encyclopedia & YRBK, Canners Publ. vol. 30, #4, 1985, p. 72.

*Primary Examiner*—Steven Weinstein
*Attorney, Agent, or Firm*—Richard Kornutik

[57] ABSTRACT

Corn kernels packaged within a bag can be popped within a microwave oven and then flavored with powdered cheese in two ways. In the first embodiment, the cheese powder is incorporated in the bag with the corn kernels, oil or shortening, and other ingredients to be subjected to microwaves. In the second embodiment, the powdered cheese is applied by sprinkling it on the ingredients within the bag after microwave corn popping, closing the bag, shaking it, and repeating the process several times. In both of these embodiments, when the cheese contacts the hot popcorn, it melts and adheres to the surface of the popcorn. To prevent the melted cheese from giving the popped corn a mottled appearance, a coloring material which generally corresponds to the color of the cheese powder is included as an ingredient in the bag of unpopped kernels. During microwave popping, the coloring is distributed in the bag and coats the popped corn. As a result, a cheese-flavored popcorn with a uniform, pleasing appearance is produced.

32 Claims, 4 Drawing Sheets

UNIFORMLY-COLORED, CHEESE FLAVORED, MICROWAVEABLE POPCORN

BACKGROUND OF THE INVENTION

For many years, people have enjoyed popped kernels of corn as a snack food. Such snacks are traditionally prepared by either pouring kernels of corn into a screen-like container suspended over an open fire, by placing kernels in a covered pan positioned on an operating kitchen stove burner, or by placing kernels in an enclosure having electrical resistance heating elements and passing current through the electrical resistance heating elements. With any of these techniques, the kernels are heated until they pop. Although these ways of popping corn having been widely used, a more convenient and faster method of preparing popcorn has long been sought. In addition, it has been desired to pop corn in a container which need not be cleaned but can instead be thrown away after use.

The demand for fast and convenient preparation of foods has not, however, been limited to popcorn; consumers have also sought to cook a wide variety of foods quickly and conveniently As a result of this need, the popularity of microwave ovens for food preparation has increased dramatically.

As those skilled in microwave technology have known for some time, microwaves heat materials selectively. Those materials that absorb microwaves (i.e. lossy materials) are heated by microwaves, while materials which reflect microwaves or are transparent to them are not greatly heated. Many foods are very effectively heated by microwaves, because the foods contain moisture which is very lossy. Consequently, microwaves are absorbed by moisture within the foods which causes the foods to be rapidly heated. This understanding of the technical basis for microwave heating has found application in preparing popcorn. Specifically, it has been discovered that moisture within the kernels of corn can be heated as they absorb microwaves. As the moisture within the kernels is heated, it vaporizes and eventually causes the kernels to pop.

The manufacturers of microwave ovens or microwave ovenware have sought to capitalize upon the ability of microwave ovens to pop corn by producing plastic, glass, or ceramic appliances for popping corn. U.S. Pat. No. 4,156,806 to Teich et. al. and U.S. Pat. No. 4,158,760 to Bowen et. al. are representative of such devices. Although such durable appliances have found utility in preparing popcorn with microwaves, they are relatively expensive and, therefore, cannot be thrown away after use. Instead, such appliances must be cleaned for reuse.

An alternative to durable appliances are cardboard containers such as those disclosed in U.S. Pat. No. 4,036,423 to Gordon and U.S. Pat. No. 4,277,506 to Austin. Similar containers can also be manufactured from plastic, as disclosed in Japanese Pat. No. 60-234562. Although such containers are disposable, their cost of materials and manufacturing are still relatively expensive. In addition, such containers tend to be bulky and, therefore, difficult to store compactly.

Bags are another way to package microwaveable popcorn. U.S. Pat. No. 3,582,363 to Jones discloses the use of a cellophane bag for packaging microwaveable popcorn. However, paper bags are more routinely used with U.S. Pat. No. 3,973,045 to Brandenberg et. al., U.S. Pat. Nos. 4,461,031 and 4,493,685 both to Blamer, and U.S. Pat. Nos. 4,450,180 and 4,548,826 to Watkins being representative of such products.

Conventionally, corn kernels packaged in bags for popping in a microwave oven require a seal at at least one end of the bag after the bag is filled with corn kernels, oil or shortening, and optionally salt and/or coloring. Sealing is usually achieved by providing a layer of adhesive material on the inside surface of the bag at the end to be sealed. The adhesive material is caused to adhere to itself by subjecting it to heat and pressure.

As an alternative to natural flavored microwave popcorn, it has been suggested that the popcorn be provided with flavorings such as butter, cheese, and caramel. Generally, such flavoring has been effected in one of three ways—i.e. treating unpopped corn kernels with flavoring, flavoring popcorn as it pops in a microwave oven, and flavoring after the corn kernels are popped.

U.S. Pat. No. 4,640,842 to May discloses infusing corn kernels with flavoring (e.g. butter or cheese) by contacting the kernels prior to microwave popping with a flavorant dissolved in an aqueous liquid Such pretreatment, however, increases processing costs, making this flavoring technique too expensive.

Flavoring during microwave corn popping is accomplished in a number of ways.

Butter can be applied to popcorn by providing plastic, glass, or ceramic appliances with an attachment to melt butter and allow it to drip on the corn kernels during microwave popping. Such devices are disclosed by U.S. Pat. No. 4,166,208 to Martel, U.S. Pat. No. 4,496,816 to McNamara, and U.S. Pat. No. 4,563,561 to Vaeth et. al.

U.S. Pat. No. 4,596,713 to Burdette flavors popcorn with butter or cheese by providing a flavorant packet inside the bag used to pop the corn and positioned above the popping corn. The packet has vent holes covered with a heat softenable film which softens during microwave popping to disperse the flavoring on the popcorn.

The easiest approach to flavoring microwave popcorn while it is being popped is to incorporate flavoring in the bag containing the corn, fat, and other ingredients.

In U.S. Pat. No. 3,851,574 to Katz, savory coatings (e.g. caramel, powdered cheese, or pizza flavorings) are applied to popcorn as it pops in a microwave oven by mixing the kernels in a bag with a hydrophillic or thermoplastic film former, fat, and salt or flavoring. The hydrophyllic film former may include hydrolysates of corn starch, molasses, or other amorphous sugars or other carbohydrates or gums which are converted to a film upon exposure to moisture.

Cheese flavorings have also been applied after microwave corn popping has ended.

In a commercial operation, U.S. Pat. No. 3,882,255 to Gorham et al. flavors popcorn produced with microwaves by conveying it through a flavoring head where flavorant is sprayed on the popcorn.

For consumers, bags of microwave popcorn have been marketed with a separate, small packet of cheese powder which is applied to the corn after popping. Such application is effected by sprinkling some of the packet's cheese on the popcorn (while hot) through an open end of the bag, closing the bag, and shaking it. This process is repeated several times. As the cheese particles contact the hot popcorn kernels coated with oil, they melt and adhere to the surface of the popcorn.

SUMMARY OF THE INVENTION

By conducting consumer preference studies, it has been found that popcorn with a uniform, deep yellow color is more appealing and suggestive of cheese flavoring than uncolored (i.e. natural) popcorn or popcorn covered only with a pale yellow color. When cheese powder with a deep yellow color is incorporated either in the bag of popcorn ingredients to be popped with microwaves or in a flavoring packet to be sprinkled on the corn after popping, it is not possible to distribute the cheese powder evenly over the popped corn. Consequently, rather than producing popcorn with a uniform, deep yellow color, the cheese-flavored popcorn has an unappetizing, mottled appearance where the particles of cheese powder have melted on the lighter colored popcorn.

It has been discovered that a uniform, appetizing appearance can be imparted to popcorn flavored with cheese either during or after microwave popping by utilizing coloring corresponding generally to that of the cheese. The coloring is included with the other ingredients in the microwave popcorn bag and is distributed in the bag during popping to coat the popped kernels. The coloring masks the points where the similarly-colored cheese particles melt on the popped corn kernels regardless of whether the cheese is applied during or after microwave popping.

The present invention utilizes a bag with gusseted side panels which are substantially equal to one another as well as front and back panels which are substantially equal. The corn kernels, oil or shortening, coloring, etc. fill the bag cross sectionally.

Prior to filling the bags with corn kernels suitable for popping with microwaves and then sealing the bags, the bags are formed in accordance with conventional procedures.

First, separate webs of paper for the outer layer of the bag, greaseproof paper for the inner layer of the bag, and a susceptor such as a polyester film (e.g. polyethylene teraphthalate) which was initially completely metallized and then selectively demetallized are produced. Such metallized films are disclosed by U.S. Pat. No. 4,267,420 to Brastad, U.S. Pat. No. 4,258,086 to Beall, and U.S. Pat. No. 4,592,914 to Kuchenbecker. Demetallizing polyester films is also well known. Typically, the polyester film is metallized and demetallized so that the percentage of light transmission of the metallized film is 35-75%, preferably 50-65%. The three webs of material are then joined together by conventional techniques to produce a laminate having two layers (i.e. paper and greaseproof paper) in some locations and three layers (i.e. paper, metallized polyester film, and greaseproof paper) in other locations. The laminate web is then folded and sealed along the length of the web to produce a tubular web which can then be cut into tubular sections of smaller length.

One end of each of the tubular segments is then sealed in a conventional manner. For example, heat and pressure can be applied to the end of the bag so that an adhesive material coated on the interior of the tube will bond the tube walls together at this location. The sealed end of the tube can then be folded across the bag and against either the front or back panel with an adhesive material being applied to maintain this fold.

After sealing one end of the bag, kernels of corn and then hot, liquified oil or shortening mixed with salt and coloring can be injected into the bag. If a lay-down bag is utilized (see U.S. Pat. No. 4,219,573 to Borek), it is preferred to maintain these injected materials at a location substantially equidistant from the ends of the bag. This is achieved by again folding the sealed end across the front or back panel of the bag at a location substantially equal to about one third of the distance between the ends of the bag. Alternatively, the bag can be folded closer to or farther from the bottom (i.e. 25% to 40% of the distance between the ends of the bag). In addition, instead of folding prior to filling, the bag can be clamped at a location during filling and folded later. No such folding is required with a stand-up bag (see U.S. Pat. No. 4,571,337 to Cage et al), because corn kernels and oil or shortening will naturally flow to the bottom panel of the bag which will desirably rest on the floor of the microwave oven. After these ingredients are injected into the bag, the hot liquified oil or shortening will cool and solidify with the corn kernels and other ingredients.

After filling, the other end of the bag is sealed using heat and pressure applied to this end of the bag so that an adhesive material coated on the interior of the bag at this end will bond the interior of the bag walls together at this location. After sealing, the top third of the bag is folded over the front or back panel so that a compact package is produced. Again, alternatively, the top end of the bag can be folded between 25% to 40% of the distance between the ends of the bag depending on how the bottom end is folded. To increase the shelf life of the product, it is desirable to enclose the filled and sealed bag in a plastic pouch made from a material conventionally utilized for such purposes (e.g. polypropylene film with a heat seal layer coated on or coextruded on one or two surfaces). Alternatively, the product's shelf life can be enhanced by freezing the packaged product.

In the first embodiment of applying cheese flavoring during microwave corn popping, powdered cheese is interspersed with the corn, oil or shortening, and other ingredients in the bag to be subjected to microwaves. As a result, the cheese powder and coloring are applied to the corn kernels during popping to produce a cheese-flavored popcorn with a deep colored, uniform, and unmottled appearance.

In the second alternative embodiment, the popcorn is flavored after popping by sprinkling powdered cheese into the popcorn bag after microwave popping. The cheese is packaged in an open-ended packet formed from a laminate of paper, polymeric material and/or metal foil. Preferably, the packet is made from a laminate having an inner layer of a polyethylene/ionomer coextrusion surrounded by aluminum foil which is covered by a layer of polyethylene over which is a sheet of paper. The packet is formed by heat sealing two sheets of the laminate along their edges.

For the first embodiment of the present invention where cheese flavoring is incorporated in the microwave popcorn bag with the other ingredients, the mass of ingredients in the bag totals 0.0973 to 0.1013 kilograms (preferably 0.0993 kilograms) and includes:

| | |
|---|---|
| Popcorn kernels (yellow, shelled medium kernels of high quality, sized so that 60 to 75 kernels will have a total mass of 10 grams) | 50–56 wt % (preferably 53.53 wt %) |
| Oil (partially hydrogenated mixture of 90 wt % soybean oil and | 32–38 wt % (preferably 35.37 wt %) |

-continued

| | |
|---|---|
| 10 wt % cottonseed oil) | |
| Salt (average size 30–65 microns) | 1.4–2.0 wt % (preferably 1.70 wt %) |
| Coloring (yellow food dyes) | .60–.67 wt % (preferably .64 wt %) |
| Cheese powder (containing dried cheese, salt, whey, delactosed whey, sour cream, flavor, color, spices, etc. | 7.0–9.2 wt. % (preferably 8.81 wt %). |

In this embodiment, the cheese powder can be any commercially available cheese powder formulation suitable for use in microwave ovens. Such products are sold by Food Materials Corporation and Universal Foods Company.

In the second embodiment of the present invention, where the cheese flavoring is in a packet separate from the bag of microwave popcorn ingredients, the mass of the ingredients in the microwave popcorn bag totals 0.0878 to 0.0918 kilograms (preferably 0.0898 kilograms) and includes:

| | |
|---|---|
| Popcorn kernels (yellow, shelled medium kernels of high quality, sized so that 60 to 75 kernels will have a total mass of 10 grams) | 60–70 wt % (preferably 68.07 wt %) |
| Oil (partially hydrogenated mixture of 90 wt % soybean oil and 10 wt % cottonseed oil) | 25–30 wt % (preferably 29.95 wt %) |
| Salt (average size 30–65 microns) | 1.0–2.5 wt % (preferably 1.41 wt %) |
| Coloring (yellow food dyes) | 0.54–0.60 wt % (preferably 0.57 wt %). |

The packet includes 0.196–0.28 grams of cheese powder per gram of popcorn kernels in the bag (preferably 0.25 grams of cheese powder per gram of popcorn kernels in the bag) of cheese powder.

DETAILED DESCRIPTION OF THE DRAWINGS

Figure 1:
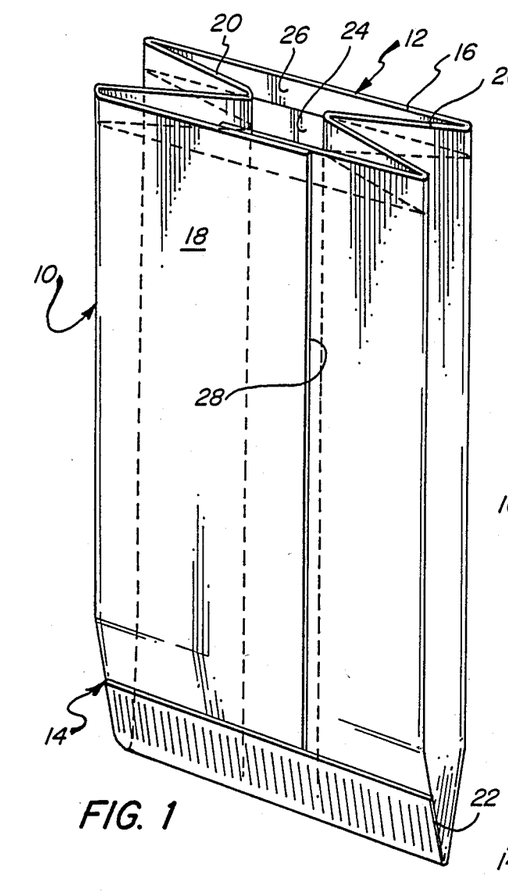
FIG. 1 is a perspective view of the back panel of an unfilled, lay-down bag made in accordance with the present invention.
Figure 2:
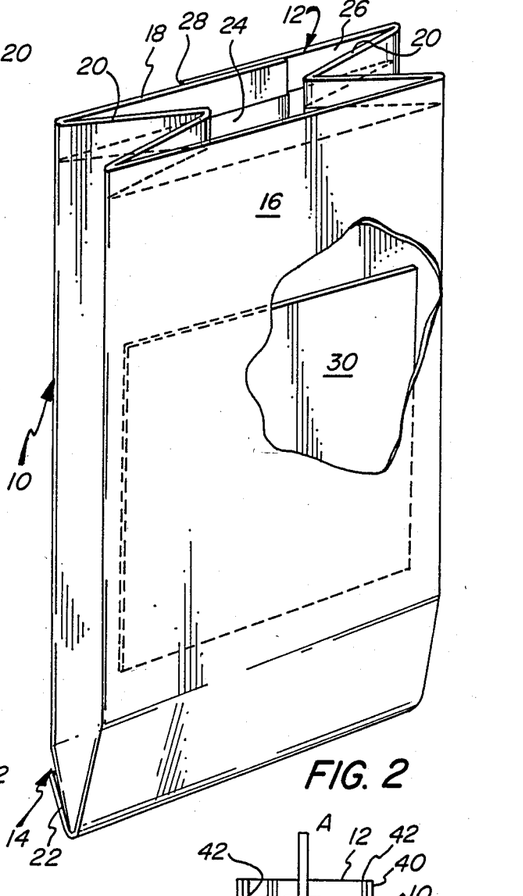
FIG. 2 is a perspective view of the front of an unfilled lay-down bag made in accordance with the present invention and with one layer of the front panel of the bag being cut away.
Figure 8:
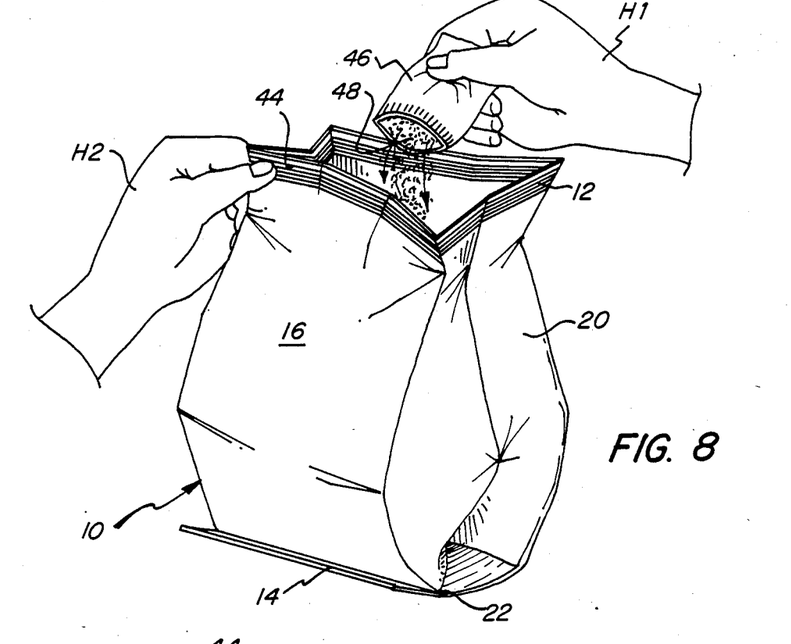
FIG. 8 is a perspective view showing cheese from the packet being added to the bag, according to the second embodiment of the present invention.
Figure 9:
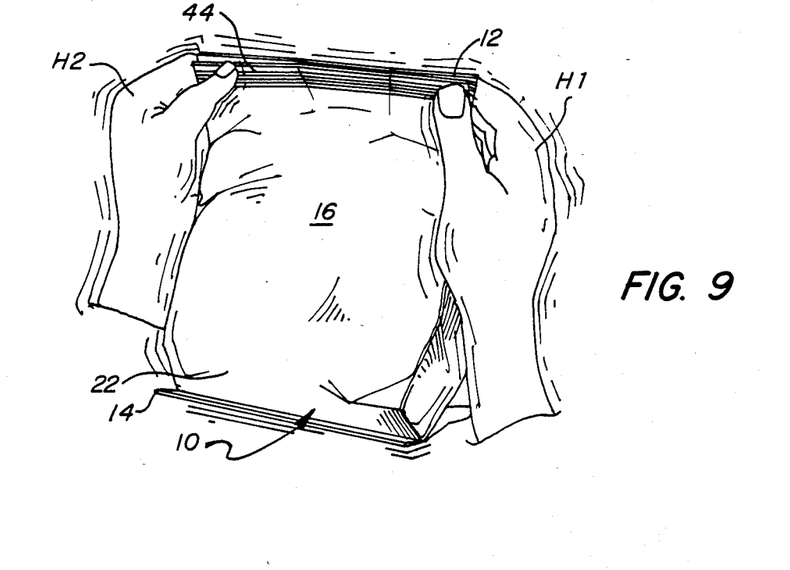
FIG. 9 is a perspective view showing the bag being shaken to distribute the previously-added cheese over the popped corn kernels, according to the second embodiment of the present invention.

Before describing the present invention with respect to the drawings, it should be understood that FIGS. 1–4, 6–7, and 10–11 are applicable both to the first embodiment of the present invention, where cheese powder is incorporated in the microwave popcorn bag with the corn kernels, oil or shortening, and other ingredients to be subjected to microwaves, and to the second embodiment of the present invention, where cheese powder is added to the microwave popcorn bag after the corn kernels are popped. FIGS. 1–2 just show the microwave popcorn bag without its ingredients which is the same for both embodiments. As to FIGS. 3–4, 6–7, and 10–11 which show the microwave popcorn bag with its popped or unpopped contents, the only difference between the embodiments (i.e. the presence or absence of cheese in the microwave bag) would not be apparent from these drawings. FIG. 5, showing the microwave popcorn bag with unpopped ingredients and the cheese flavor packet, relates to the second embodiment where cheese from the packet is sprinkled into the bag after corn popping; however, the bag and its ingredients shown in this Figure would be the same for the first embodiment except that it would also contain cheese powder. FIGS. 8–9 relate solely to the second embodiment.

FIG. 1 is a perspective view of the back of an empty, lay-down bag 10. The bag is provided with a front panel 16, a back panel 18, and a pair of inwardly-folded, gussetted side panels 20 all of which extend between an open top end 12 and a sealed bottom end 14. Bottom end 14 is folded over and bonded to back panel 18 at bottom seal 22. Bag 10 is sealed longitudinally by back panel seal 28 which extends between top end 12 and bottom end 14. The gussetted side panels 20 extend inwardly toward each other between front panel 16 and back panel 18; however, a center strip 24 of front panel 16 and back panel 18 lies between the innermost point of the gussetted side panels 20. The interior of bag 10 near top end 12 is provided with an adhesive 26 which bonds to itself upon application of heat and pressure.

FIG. 2 is a perspective view of the front of an empty, lay-down bag according to the present invention. Within front panel 16 is a susceptor 30 formed from a metallized and selectively demetallized polyester film. Although a wide variety of metals and polyester films can be used to produce susceptor 30, the preferred polyester film is polyethylene terephthalate, while the metal is preferably aluminum. Instead of metallizing and de-metallizing polyester film, a metallized polyester film can be cut to the desired size and placed between layers of paper or other laminating materials. Alternatively, a susceptor material can be printed on a paper layer or on another laminating material.

Front panel 16 and back panel 18 have a width across top end 12 which is generally about 1.3 to 1.5 and preferably about 1.4 times as large as the width of each of the gussetted side panels 20 folded into bag 10. The ratio of the width of susceptor 30 across bag 10 to its length extending partially between top end 12 and bottom end 14 is generally about 1:1.0 to 1:1.4, preferably about 1:1.15.

Figures 3, 4:
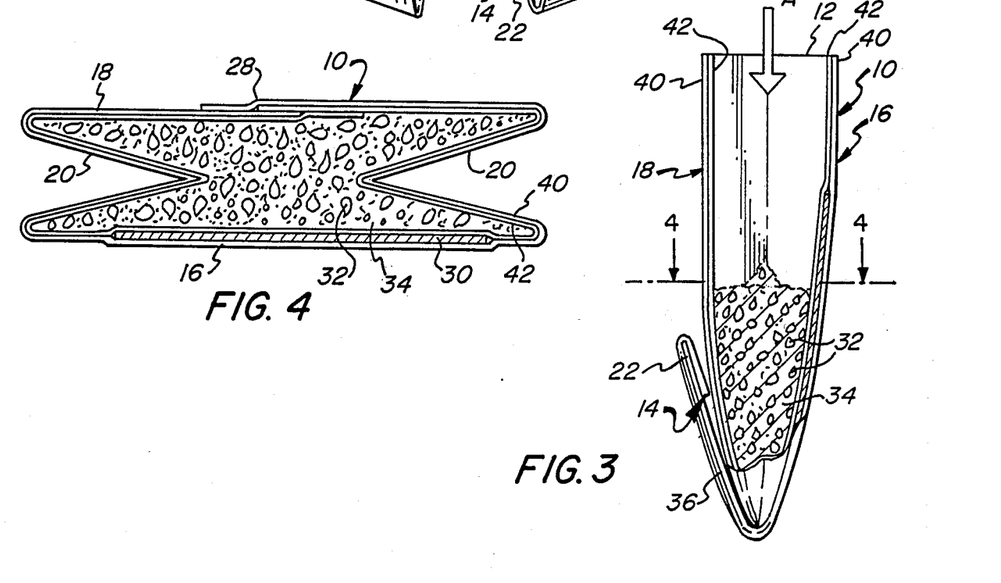
FIG. 3 is a cross-sectional side view of a lay-down bag in accordance with the present invention with one end sealed and filled with corn kernels and oil or shortening.
FIG. 4 is a top cross-sectional view taken along line 4—4 of FIG. 3.

FIG. 3 is a side cross-sectional view of a lay-down bag according to the present invention which is filled with unpopped corn kernels 32 and shortening or oil 34. These materials and optionally coloring additive(s) or salt are injected through top end 12 of bag 10, as indicated by arrow A. Preferably, the kernels are first injected, with the shortening or oil mixed with salt and coloring being added subsequently. Prior to injecting corn kernels 32 and oil or shortening 34, the lower third of the bag is folded toward back panel 18 to form a folded lower end 36. As a result, the unpopped kernels of corn 32, the shortening or oil 34, and any other ingredients are held within the middle third of the lay-down bag substantially equidistant from ends 12 and 14. Although the shortening or oil 34 is added in a hot liquified state, it eventually cools and solidifies in admixture with the other ingredients.

FIG. 3 also shows a side cross-sectional view of the laminates which form bag 10, while FIG. 4 shows a top cross sectional view of the bag shown in FIG. 3 taken along line 4—4. Bag 10 is formed from a three layered laminate at front panel 16 and a two layered laminate every where else except at back panel seal 28 where the two layered laminates overlap. The three layered laminate at front panel 16 consists of an outer paper layer 40, and an inner greaseproof paper layer 42, and a susceptor 30 between layers 40 and 42. Elsewhere, the bag is only laminated by outer paper layer 40 and inner greaseproof paper layer 42.

As they relate to the two embodiments of the present invention, FIGS. 3 and 4 would be the same except that in the first embodiment (but not the second embodiment) the microwave popcorn bag would contain cheese powder interspersed with in and addition to the depicted corn kernels, oil or shortening, coloring, etc. For the second embodiment where cheese powder is added to the bag after microwave corn popping, the microwave popcorn bag contains corn kernels, oil or shortening, color, etc., while the cheese powder is in a separate packet, as described in FIG. 5.

Figures 5, 6:
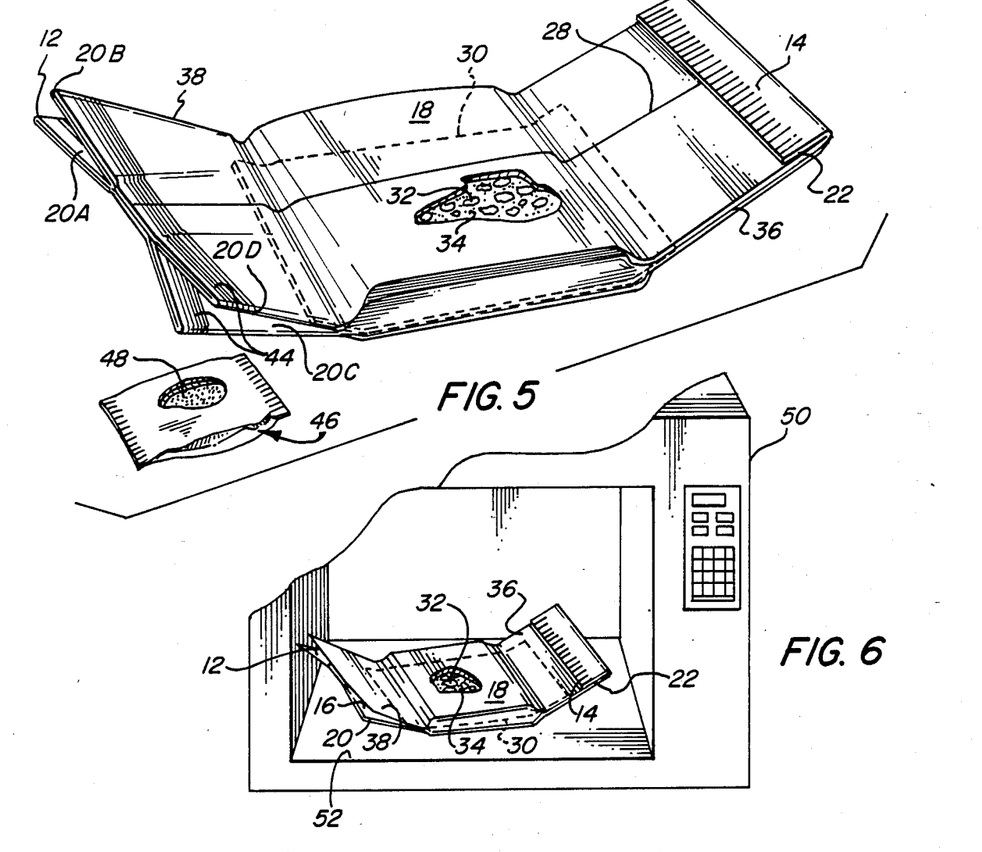
FIG. 5 is a perspective view of a kit for preparing microwaveable popcorn and flavoring it with cheese, according to the second embodiment of the present invention, which includes kernels of corn and shortening or oil and having both ends sealed and a packet of powdered cheese.
FIG. 6 is a perspective view of a lay-down bag made in accordance with the present invention containing kernels of corn and oil or shortening with the bag having both ends sealed and being positioned within a microwave oven.

FIG. 5 shows a perspective view of a lay-down bag filled with unpopped kernels of corn 32 and solidified oil or shortening 34 and having top end 12 and bottom end 14 sealed. This filled and sealed bag not only has a folded lower end 36, it is also provided with an upper end 38 folded toward back panel 18. Folded lower end 36 and folded upper end 38 can be folded over the portion of bag 10 containing unpopped corn kernels 32 and oil or shortening 34 for compact packaging and shipping. In this folded position, the bag can be frozen and/or sealed within a pouch (not shown) of plastic (e.g. polypropylene film) to increase the shelf life of the product.

Bag 10 is sealed across top end 12 by a plurality of sealing lines 44 which are impressed into the exterior of the bag by a pair of sealing jaws (not shown) at least one of which is heated. When pressure within bag 10 exceeds a certain level due to the generation of water vapor from the popping corn kernels, the seal formed by sealing lines 44 weakens, and bag 10 opens at top end 12.

FIG. 5 also shows a perspective view of a packet 46 of powdered cheese 48. Packet 46 is flexible and preferably made from a laminate comprising an inner layer of a polyethylene/ionomer coextrusion surrounded by aluminum foil which is covered by a layer of polyethylene over which is a sheet of paper. The cheese powder 48 includes: spray dried cheese, artificial and natural flavoring, coloring, and spices. The coloring in both the cheese powder in packet 46 and in the oil or shortening in bag 10 is the same—preferably a blend of FD&C Yellow Nos. 5 and 6.

For the first embodiment of the present invention, the microwave popcorn bag would be the same as bag 10 in FIG. 5, except that the cheese powder would be in the bag rather than in a separate packet. Again, the cheese powder and the oil or shortening would have the same color—preferably a blend of FD&C Yellow Nos. 5 and 6. The same is true for FIG. 6.

As shown in FIG. 6, the sealed bag filled with corn kernels, solidified shortening or oil, etc. is placed on the floor 52 of microwave oven 50. The bag is positioned with front panel 16 which contains susceptor 30 closest to the oven floor 52. In addition, folded lower end 36 and folded upper end 38 are spread apart from the portion of the bag containing corn kernels 32 and solidified shortening or oil 34. After placing the bag on oven floor 52 in this manner, the door (not shown) of microwave oven 50 is closed, and the microwave oven is turned on for approximately 5 minutes. The kernels then begin to pop as a result of moisture within each kernel vaporizing. This evaporation of moisture causes the bag to expand such that back panel 18 moves upwardly away from front panel 16. In addition, inwardly-folded gussetted side panels 20 move outwardly so that each of the folded parts comprising each gusset move apart.

Instead of placing the bag on the actual floor of the oven 52, it can rest on an elevated support provided as an accessory to the oven or as an element of the packaging.

Figure 7:
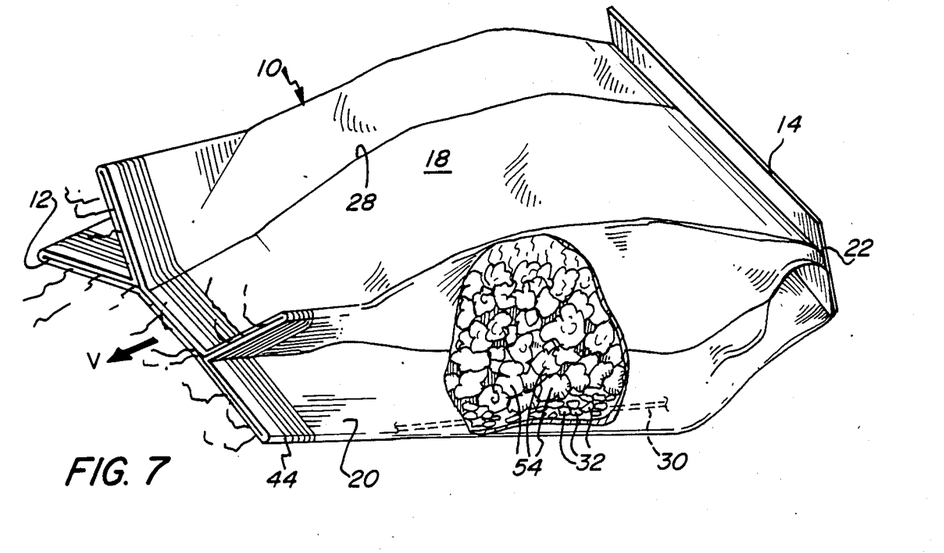
FIG. 7 is a perspective view of a lay-down bag made in accordance with the present invention containing kernels popped with microwaves.

FIG. 7 is a perspective view of a sealed lay-down bag containing popped corn 54. As a result of vaporized moisture produced when corn kernels are popped, the bag has expanded. During popping of the corn kernels, the evolved water vapor has increased the pressure within the bag above a predetermined pressure at which the seal formed by sealing lines 44 will open. Once this seal opens, vapors V are vented from the bag.

By utilizing the package of the present invention, a large percentage of the kernels in the package pop; however, a few unpopped corn kernels 32 will remain after popping. Once popping has begun, the popped kernels 54 tend to collect within the bag at a level above the unpopped corn kernels 32. As shown in FIG. 7, these unpopped kernels 32 form a layer at the bottom of the bag adjacent to susceptor 30. By being in a location adjacent the susceptor, the likelihood that the unpopped kernels will be popped increases, because heat emanates from the susceptor as a result of it being in contact with microwaves. After popping, bag 10 can be opened for either consumption if the first embodiment of the invention is practiced or addition of cheese flavoring according to the second embodiment of the invention.

As it relates to the two embodiments of the present invention, FIG. 7 is the same except that in the first embodiment (but not the second), the popped corn has a coating of cheese and coloring corresponding to the color of the cheese. By contrast, in the second embodiment, the popcorn would not be coated with cheese but only with coloring corresponding to that of the subsequently-added cheese, as described below with reference to FIGS. 8-9.

FIGS. 8-9 are perspective views showing how cheese powder 48 is added to bag 10 containing popped corn, according to the second embodiment of the present invention. The user does this by grasping packet 46 with one hand H1 and by holding bag 10 with his other hand H2. Cheese powder 48 is then poured from a previously-opened end of packet 46 into bag 10 through opened top end 12. After cheese powder is added in this manner, the cheese is distributed over the popped corn kernels in bag 10 by holding top end 12 closed with hands H1 and H2 and shaking the bag. Preferably, cheese powder 48 is applied to the corn kernels by adding a portion of the powder in packet 46 to bag 10, shaking the bag, and repeating these steps two more times. As a result, the present invention produces a cheese-flavored popcorn with a uniform, unmottled, and pleasing appearance.

Figure 10:
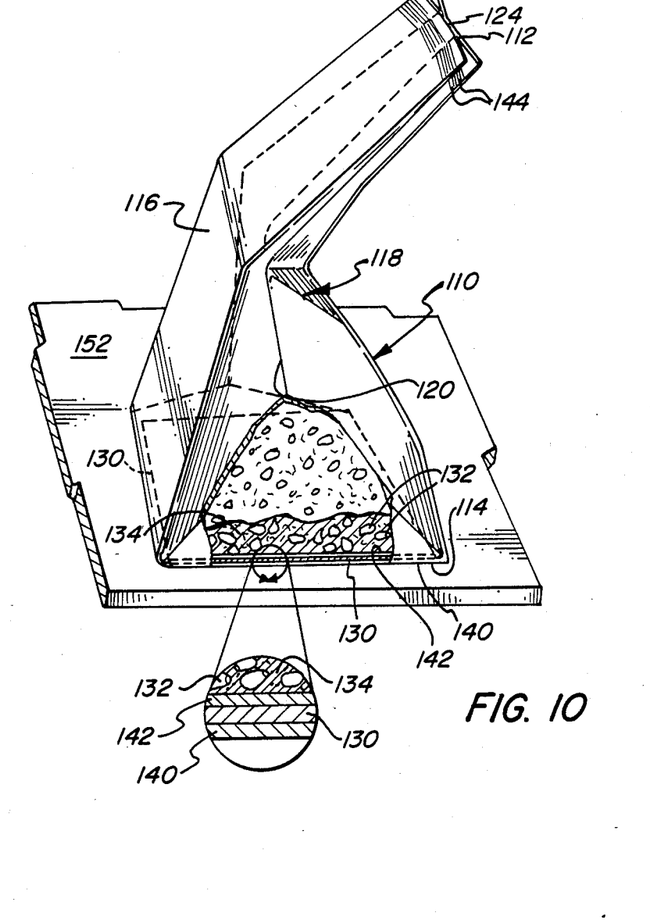
FIG. 10 shows a perspective view of a stand-up bag filled with corn kernels and oil or shortening and having a sealed end.
Figure 11:
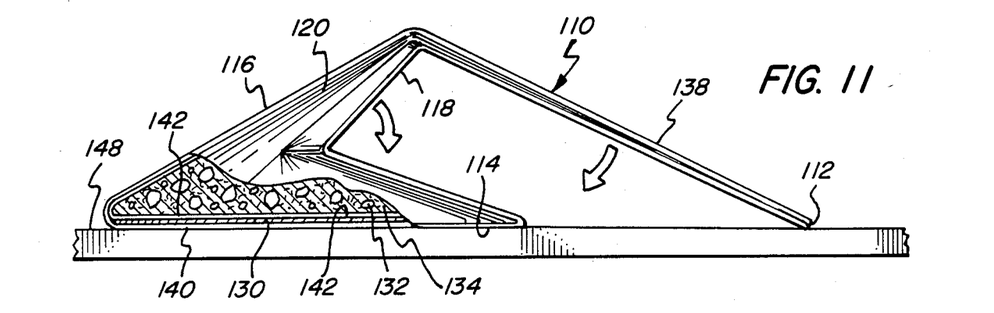
FIG. 11 is a side cross-sectional view of a stand-up bag in a semi-compacted position, filled with unpopped corn kernels and oil or shortening, and sealed in accordance with the present invention.

FIGS. 10 and 11 show another embodiment of the present invention which utilizes a stand-up bag 110. This bag is provided with a front panel 116, a back panel 118, and a pair of inwardly-folded gussetted side panels 120 which extend between a top end 112 and conventional bottom panel 114. As in the lay-down bag embodiment, a center strip 124 is formed between the innermost extent of the inwardly-folded gussetted side panels 120. Susceptor 130, a metallized polyester film, is located in bottom panel 114. The laminations of the stand up bag embodiment are similar to those of the lay-down bag embodiment, except that the stand-up bag embodiment has the three layer lamination (i.e. outer paper layer 140, inner greaseproof paper layer 142, and susceptor of metallized polyethylene terephthalate 130) formed in bottom panel 114 instead of the front panel. Front panel 116, back panel 118, and inwardly-folded gussetted side panels 120 all are formed from a laminate of two layers—i.e. an outer paper layer 140 and an inner greaseproof paper layer 142.

Like the lay-down bag embodiment, the stand-up bag embodiment also has a longitudinally-extending back seam (not shown) on back panel 118. In addition, the interior of the bag adjacent top end 112 is provided with a layer of adhesive (not shown) which will seal the bag at top end 112 upon the application of pressure and heat from a pair of sealing jaws.

The packaged product shown in FIGS. 10 and 11 is prepared by first filling stand-up bag 110 with unpopped kernels 132, then filling with oil or shortening, a coloring additive, and, optionally, salt 134, and finally sealing top end 112. As shown by the arrows in FIG. 11, stand-up bag 110 can be folded into thirds for compact packaging, storage, and shipment by moving back panel 118 downwardly toward bottom panel 114 and then folding upper end 138 against the opposite side of bottom panel 114.

Following filling and sealing of stand-up bag 110, the oil or shortening 134 cools and solidifies. When the filled and sealed stand-up bag 110 is placed in a microwave oven so that bottom panel 114 rests on the oven floor 152 and the oven is turned on, moisture within the kernels begins to vaporize which eventually pops the kernels. As the kernels pop, they will move upwardly within the bag. The unpopped kernels will tend to return to a position closer to bottom panel 114 than the popped kernels due to their difference in density. This brings the unpopped kernels closer to susceptor 130 so that heat emanating from the susceptor can more easily pop the kernels. The generation of water vapor within stand-up bag 110 as a result of kernels being popped causes the bag to expand at front panel 116, back panel 118, and inwardly-folded gussetted side panels 120. The top end 112 of stand up bag 110 is sealed in the same manner as the top end of the lay-down bag. Specifically, a plurality of impressed sealing lines 144 extend across top end 112 to seal the bag until a predetermined pressure is reached.

As they relate to the two embodiments of the present invention, FIGS. 10-11 would be the same except that in the first embodiment (but not in the second embodiment), cheese flavoring would be interspersed with the corn, oil or shortening, coloring, etc. in bag 110. In the second embodiment, the cheese would be stored in and applied from a separate pouch like that shown in FIGS. 5 and 8-9.

EXAMPLE 1

To a gussetted paper bag constructed as described above with regard to FIGS. 1-9, 53.2 grams of medium yellow hybrid popcorn, 35.1 grams of melted partially hydrogenated soybean oil mixed with 1.7 grams of superfine salt, 0.64 grams of a color blend of FD&C Yellow Nos. 5 and 6 dispersed in oil, and 8.8 grams of cheese powder formed from a mixture of cheddar cheese, powder, salt, whey, sour cream, corn starch, natural and artificial flavors, coconut oil, reduced lactose whey, MSG, citric acid, lactic acid, the color blend of FD&C Yellow Nos. 5 and 6, and spice are added. The bag is heat sealed at the open end, folded into thirds, and held at room temperature for 24 hours to allow the oil to solidify.

The heat sealed bag is placed in a microwave oven with susceptor side down. The popcorn is heated for 3 to 3½ minutes on high until popping is completed. The bag, with a popped corn volume of 2200 cc and 3.7-8.0% of unpopped kernels, is removed from the microwave oven and allowed to cool with the top open.

The resulting product has a deep, attractive yellow-/orangish color, evenly spread over most of the kernels of popped corn and has a pleasant cheddar cheese flavor when eaten.

EXAMPLE 2

A bag of microwaveable popcorn is manufactured and popped as in Example 1 above, except that the 8.8 grams of cheese powder is replaced with 8.4 grams of nacho-flavored cheese powder. The nacho-flavored cheese powder is like the cheddar cheese flavored powder in Example 1, except that the nacho cheese flavor additionally includes romano and parmesan cheeses and onion and garlic spices.

The heat sealed bag containing the unpopped corn is placed in a microwave oven, susceptor side down. The popcorn is heated for 3 to 3½ minutes until most of the corn kernels are popped. The resulting popcorn will have a deep yellow color with a pleasant nacho cheese flavor.

EXAMPLE 3

To a gussetted paper bag constructed as described with respect to FIGS. 1-9 above, 61 grams of medium yellow hybrid popcorn, 27 grams of melted partially hydrogenated soybean oil mixed with 1.3 grams of superfine granulated salt and 0.5 grams of a color blend of FD&C Yellow #5 and #6 dispersed in oil are added. The bag is heat sealed at the open end, folded into thirds and held at room temperature for 24 hours to allow the oil to solidify.

To a separate 4 inch by 5 inch pouch made from a laminate of an outer layer of aluminum foil and an inner layer of polymeric material, 15 grams of a dried cheddar cheese flavored powder containing cheddar cheese, salt, whey, sour cream, corn starch, natural and artificial flavors, coconut oil, reduced lactose whey, MSG, citric acid, lactic acid, the color blend of FD&C Yellow #5 and #6, and spice are added, and the pouch is sealed.

The heat sealed bag containing the unpopped corn is placed in a microwave oven with the susceptor side down. The popcorn is heated for 3 to 3½ minutes until popping is completed. The bag, with a popped corn volume of 2200 cc and 8-10% of unpopped kernels, is removed from the microwave oven and allowed to cool for 2 to 3 minutes with the top open.

To the opened bag containing the popped corn, about ½ of the cheddar cheese flavored powder from the pouch is added. The bag is then closed and vigorously shaken for about 10 to 15 seconds. This procedure is repeated with the remaining cheese powder.

The resulting product has a deep, attractive yellow-/orangish color evenly distributed over most of the kernels of popped corn and has a pleasant cheddar cheese flavor when eaten.

EXAMPLE 4

A bag of microwaveable popcorn is manufactured and popped exactly like that described in Example 3 above. To a separate small pouch like that described in Example 3, 15 grams of nacho-flavored cheese powder is added, and the pouch is heat sealed. The nacho cheese flavor is like the cheddar cheese flavored powder in Example 3, except that the nacho cheese flavor additionally includes romano and parmesan cheeses and onion and garlic spices.

The heat sealed bag containing the unpopped corn is placed in a microwave oven susceptor side down. The popcorn is heated for 3 to 3½ minutes until most of the corn kernels are popped.

The bag containing the popped corn is removed from the oven and emptied into a large bowl. The nacho cheese flavored powder is then sprinkled slowly over the popcorn while tossing the corn with a large spoon until it is evenly coated.

The resulting popcorn from this procedure will be deep yellow in color with a pleasant nacho cheddar cheese flavor.

Although the invention has been described in detail for the purpose of illustration, it is understood that such detail is solely for that purpose, and variations can be made therein by those skilled in the art without departing from the spirit and scope of the invention which is defined by the following claims.

We claim:

1. In a method of preparing popcorn with microwaves and then imparting a cheese flavoring to the popcorn comprising:

subjecting a package comprising a plurality of corn kernels and oil or shortening to microwaves to form popped corn kernels and sprinkling powdered cheese of different color than said popped corn kernels on the popped corn kernels only in an amount at which the popped corn kernels will have a mottled appearance, the improvement comprising:

incorporating in the package prior to popping a food color substantially similar to the color of the cheese flavoring and in an amount such that a cheese-flavored popcorn product with a uniform, unspeckled, and pleasing appearance is produced.

2. A method according to claim 1, wherein the powdered cheese is packaged in a sealed, flexible packet.

3. A method according to claim 2, wherein the flexible packet is a laminate having layers of polymeric material, metal foil, and paper.

4. A method according to claim 1, wherein said sprinkling is effected while the popped corn kernels are in the package and further comprising:

shaking the package following said sprinkling to distribute the powdered cheese on the popped corn kernels.

5. A method according to claim 4, further comprising:

after said shaking, repeatedly sprinkling powdered cheese on the popped corn kernels while in the package and shaking the package.

6. A method according to claim 1, wherein the powdered cheese contains food color.

7. A method according to claim 6, wherein the food color in the powdered cheese and the package is the same.

8. A method according to claim 7, wherein the food color is a blend of FD&C Yellow Nos. 5 and 6.

9. A method according to claim 1, wherein the powdered cheese comprises spray dried cheese, artificial and natural flavoring, food color, and spices.

10. A method according to claim 1, wherein the package is an elongate bag with a pair of ends between which a front panel, a back panel, and inwardly-folded, gussetted side panels connecting the front panel and the back panel extend.

11. A method according to claim 10, wherein said sprinkling is effected while the popped corn kernels are in the bag and further comprising:

shaking the bag following said sprinkling to distribute the powdered cheese on the popped corn kernels.

12. A method according to claim 11, further comprising:

after said shaking, repeatedly sprinkling cheese on the popped corn kernels while in the bag and shaking the bag.

13. In a product for preparing cheese-flavored popcorn with microwaves comprising:

a package containing a plurality of unpopped corn kernels and either oil or shortening, wherein said package is suitable for placement in a microwave oven to effect popping of the corn kernels with microwaves to form popped corn kernels and a powdered cheese of different color than said popped corn kernels and present only in an amount at which, when said powdered cheese is applied to said popped corn kernels, said popped corn kernels have a mottled appearance, wherein the improvement comprises incorporating in said package a food color substantially similar to the color of said powdered cheese, whereby, during popping of the corn kernels, said food color is distributed in said package and coats the popped corn so that when said powdered cheese is applied to the popcorn, a cheese-flavored popcorn product with a uniform, unmottled, and pleasing appearance is produced.

14. A product according to claim 13, wherein said powdered cheese is contained separate from said package containing the unpopped corn kernels, the oil or shortening, and the food color.

15. A product according to claim 14, wherein said product is a kit comprising said package and a packet containing said powdered cheese.

16. A product according to claim 15, wherein the packet is a flexible laminate formed from layers of polymeric material, metal foil, and paper.

17. A product according to claim 13, wherein said powdered cheese is admixed with the unpopped corn kernels, the oil or shortening, and the food color in said package.

18. A product according to claim 14 or 17, wherein said package is an elongate bag with a pair of ends between which a front panel, a back panel, and inwardly-folded, gussetted side panels connecting the front panel and the back panel extend.

19. A product according to claim 18, wherein the bag is a lay-down bag.

20. A product according to claim 18, wherein the bag is a stand-up bag having a flat bottom panel at one end.

21. A product according to claim 18, wherein the bag is a laminate having an outer layer of paper, an inner layer of greaseproof paper, and a microwave susceptor between the inner and outer layers in part of the bag.

22. A product according to claim 18, wherein the bag is a laminate having an outer layer of paper, an inner layer of polymeric material, and a microwave susceptor between the inner and outer layers in part of the bag.

23. A product according to claim 18, wherein the plurality of corn kernels, the oil or shortening, and the food color substantially fill the bag cross-sectionally.

24. A product according to claim 18, wherein the corn kernels, the oil or shortening, and the food color is substantially equidistant from the ends of said bag.

25. A product according to claim 13, wherein the oil or shortening is solidified.

26. A product according to claim 13, further comprising salt in admixture with said corn kernels and said oil or shortening.

27. A product according to claim 13, wherein said powdered cheese further comprises food color.

28. A product according to claim 27, wherein the food color in said powdered cheese and said package is the same.

29. A product according to claim 28, wherein the food color is a blend of FD&C Yellow Nos. 5 and 6.

30. A product according to claim 13, wherein said powdered cheese comprises spray dried cheese, artificial and natural flavoring, food color, and spices.

31. In a kit for preparing cheese-flavored popcorn with microwaves comprising:
an elongate bag with a pair of ends between which a front panel, a back panel, and inwardly-folded gussetted side panels connecting the front panel and the back panel extend containing a plurality of corn kernels and solidified oil or shortening as ingredients, the ingredients substantially filling said bag cross-sectionally equidistant from the ends of the bag, said bag being a laminate having an outer paper layer, an inner paper layer of greaseproof paper, and a microwave susceptor between the inner and outer layers in the front panel of said bag, said bag being suitable for placement in a microwave oven to effect popping of the corn kernels with microwaves to form popped corn kernels;
a sealed, flexible packet formed from a laminate having layers of a polymeric material, metal foil, and paper and containing a powdered cheese formulation comprising a blend of F D & C Yellow Nos. 5 and 6 food color, the powdered cheese formulation being of different color than said popped corn kernels and being present only in an amount at which, when said powdered cheese formulation is applied to the plurality of popped corn kernels, after microwave popping, said popped corn kernels have a mottled appearance, wherein the improvement comprises incorporating in said bag a blend of F D & C Yellow Nos. 5 and 6 food color substantially similar to the food color in the powdered cheese formulation and in an amount such that, during microwave popping of the corn kernels, the food color in said bag is distributed and coats the popped corn so that when the powdered cheese formulation in said packet is applied to the popcorn in said bag, after its removal from the microwave oven, a cheese-flavored popcorn product with a uniform, unmottled, and pleasing appearance is produced.

32. In a product for preparing cheese-flavored popcorn with microwaves comprising:
an elongate bag with a pair of ends between which a front panel, a back panel, and inwardly-folded gussetted side panels connecting the front panel and the back panel extend, said bag being a laminate having an outer paper layer, an inner layer of greaseproof paper, and a microwave susceptor between the inner and outer layers in the front panel of said bag, said bag being suitable for placement in a microwave oven to effect popping of the corn kernels with microwaves to form popped corn kernels and
popcorn ingredients substantially filling said elongate bag cross-sectionally equidistant from the ends of the bag, said popcorn ingredients comprising a plurality of corn kernels, solidified oil or shortening, and a powdered cheese formulation comprising F D & C Yellow Nos. 5 and 6 food color, the powdered cheese formulation being of different color than said popped corn kernels and being present only in an amount at which, when the powdered cheese is applied to the plurality of popped corn kernels, said popped corn kernels have a mottled appearance, wherein the improvement comprises incorporating in said bag a blend of F D & C Yellow Nos. 5 and 6 food color substantially similar to the food color in the powdered cheese formulation, and in an amount such that, during microwave popping of the corn kernels, the food color in said bag is distributed and coats the popped corn so that when the powdered cheese formulation is applied to the popcorn, a cheese-flavored popcorn product with a uniform, unmottled, and pleasing appearance is produced.

* * * * *